United States Patent
Heijdel et al.

(10) Patent No.: US 9,578,984 B2
(45) Date of Patent: Feb. 28, 2017

(54) PAD, PAD HOLDER, ASSEMBLY, AND METHOD FOR PRODUCING A BEVERAGE

(75) Inventors: Frederike Ingeborg Heijdel, Nieuwegein (NL); Christiaan Jos Van Der Veen, Nieuwegein (NL); Gustaaf Frans Brouwer, Nijkerk (NL); Ivo Van Os, Amersfoort (NL); Wenda Corina De Koning, Scherpenzeel (NL)

(73) Assignee: Koninklijke Douwe Egberts B.V., Utrecht (NL)

(*) Notice: Subject to any disclaimer, the term of this patent is extended or adjusted under 35 U.S.C. 154(b) by 506 days.

(21) Appl. No.: 12/512,871

(22) Filed: Jul. 30, 2009

(65) Prior Publication Data

US 2011/0027425 A1    Feb. 3, 2011

(51) Int. Cl.
*A47J 31/06* (2006.01)
*B65D 85/804* (2006.01)

(52) U.S. Cl.
CPC ...... *A47J 31/0668* (2013.01); *B65D 85/8043* (2013.01); *B65D 85/8046* (2013.01)

(58) Field of Classification Search
CPC .... A47J 31/0668; A47J 31/407; A47J 31/368; A47J 31/369; A47J 31/3623; B65D 85/8046; B65D 85/8043; B65D 85/808
USPC ... 426/80, 112, 115, 77, 78, 79; 99/295, 323
See application file for complete search history.

(56) References Cited

U.S. PATENT DOCUMENTS

| | | | |
|---|---|---|---|
| 1,576,735 A * | 3/1926 | Fessenden | 426/77 |
| 3,445,237 A * | 5/1969 | Gidge | 426/77 |
| 4,446,158 A * | 5/1984 | English et al. | 426/79 |
| 5,043,172 A | 8/1991 | Loizzi | |
| 5,082,676 A * | 1/1992 | Love et al. | 426/79 |
| 5,477,775 A | 12/1995 | Delhom et al. | |
| 5,518,743 A | 5/1996 | Pergola et al. | |
| 5,826,492 A * | 10/1998 | Fond et al. | 99/295 |
| 6,004,593 A | 12/1999 | Soughan | |
| 6,832,542 B2 * | 12/2004 | Hu et al. | 99/302 R |

(Continued)

FOREIGN PATENT DOCUMENTS

| | | |
|---|---|---|
| CA | 2114381 A | 7/1994 |
| EP | 1 371 311 | 12/2003 |

(Continued)

OTHER PUBLICATIONS

Definition of "recess" Webster's New World Dictionary, 3rd College Edition, 1988. Simon & Schuster.*

*Primary Examiner* — Viren Thakur
(74) *Attorney, Agent, or Firm* — Foley & Lardner LLP (57) ABSTRACT

Pad for producing a beverage, provided with a first permeable layer and a second permeable layer opposite to the first permeable layer. The pad is further provided with a filling arranged in between the first and second permeable layer. The pad is arranged for receiving pressurized water through the first permeable layer, for dissolving, dispersing, and/or extracting at least part of the filling in the received pressurized water. The pad is arranged for releasing through the second permeable layer the water with the at least part of the filling dissolved, dispersed, and/or extracted therein. The first permeable layer has a plurality of apertures for receiving the pressurized water. The apertures have a size dimensioned for establishing swirling motion of the water inside the filling.

27 Claims, 6 Drawing Sheets

(56) References Cited

U.S. PATENT DOCUMENTS

2004/0197444 A1* 10/2004 Halliday et al. .............. 426/112
2005/0076783 A1* 4/2005 Kodden et al. ................. 99/275
2008/0028946 A1* 2/2008 Kirschner et al. ............. 99/287
2010/0028495 A1* 2/2010 Novak et al. .................. 426/77

FOREIGN PATENT DOCUMENTS

| EP | 1398279 A2 * | 3/2004 | |
|----|----|----|----|
| EP | 1704803 A1 * | 9/2006 | |
| EP | 1826148 A1 * | 8/2007 | |
| WO | WO 0051478 A1 * | 9/2000 | |
| WO | WO 2006030461 A1 * | 3/2006 | |
| WO | WO 2006043098 A1 * | 4/2006 | |
| WO | WO 2006043106 A2 * | 4/2006 | |
| WO | WO 2007096196 A2 * | 8/2007 | |
| WO | WO 2007125337 A1 * | 11/2007 | .......... A47J 31/0668 |
| WO | WO-2008/006297 | 1/2008 | |
| WO | WO 2008078989 A1 * | 7/2008 | |
| WO | WO 2008148650 A1 * | 12/2008 | |

\* cited by examiner

PAD, PAD HOLDER, ASSEMBLY, AND METHOD FOR PRODUCING A BEVERAGE

BACKGROUND

The invention relates to a pad for producing a beverage, provided with a first permeable layer and a second permeable layer opposite to the first permeable layer, further provided with a filling arranged in between the first and the second permeable layer. The invention further relates to a pad holder provided with a cavity for receiving the pad. The invention also relates to an assembly of the pad, the pad holder, and/or a coffee machine. In addition, the invention relates to a method of producing a beverage by using a pad provided with a first permeable layer and a second permeable layer opposite to the first permeable layer, further provided with a filling arranged in between the first and second permeable layer.

Such a pad is known for example from EP 1 398 279. Therein a pad is described that is suitable for making cappuccino. Except for making coffee-based beverages, there is a need for making other beverages from pads as well. However, it turns out that for some beverages, the process of dissolving, dispersing, and/or extracting the filling by means of the received water is insufficient. As a result, a rather watery beverage is obtained. This problem limits a further extension of pad-based beverage generation outside the domain of coffee-based beverages. Such an extension would be highly desirable, as machines for pad-based generation of coffee-based beverages are already widespread. Such an extension thus would benefit a large amount of people.

SUMMARY

It is therefore an objective of the invention to provide an improved pad, which is suitable for making beverages that benefit from enhanced dissolving, dispersing, and/or extracting of the filling.

Accordingly, the invention provides a pad for producing a beverage, provided with a first permeable layer and a second permeable layer opposite to the first permeable layer, further provided with a filling arranged in between the first and the second permeable layer, wherein the pad is arranged for receiving pressurized, and preferably hot, water through the first permeable layer, for dissolving, dispersing, and/or extracting at least part of the filling in the received pressurized water, and for releasing through the second permeable layer the water with the at least part of the filling dissolved, dispersed, and/or extracted therein, wherein the first permeable layer has a plurality of apertures for receiving the pressurized water, which apertures have a size dimensioned for establishing swirling motion of the water inside the filling. In use, the water will pass the first permeable layer predominantly through the apertures. As a total area of the apertures is smaller than a total surface area of the first permeable layer, a relatively large inflow flowrate of the pressurized water is realised through the apertures. Due to the relatively large flowrate, this inflow will experience a relatively large flow resistance by the filling and/or the second permeable layer. As a result, part of the water will be deflected sidewards, i.e. approximately parallel with the first and second permeable layer, and possibly even in a direction back to the first permeable layer. In this way a swirling motion of the water inside the filling can be created. As a result of the swirling motion, dissolving, dispersing, and/or extracting of the at least part of the filling in the water is increased.

When using known pads, normally only a small amount of the filling is dispersed, which may show up as a small residue in the beverage after it has left the pad. However, due to the swirling, significant dispersion may take place inside the pad. Promoting swirling in this way goes against a common believe that dispersion of the filling should be avoided, to prevent formation of the residue in the beverage.

According to the invention, the apertures have a size dimensioned for establishing swirling motion of the water inside the filling. It will be clear to the skilled person that, if the apertures are too small, the flowrate of the inflow through the apertures is too small. As a result, too few water will flow through the pad, or the water may even enter or pass the pad through other ways than through the apertures. It will further be clear to the skilled person that, if the apertures are too large, enough water may flow through the pad, but the increase in inflow flowrate effected by the apertures will be too small so that no or only weak jets will be formed.

Preferably, the apertures have a size dimensioned for creating jets of the water into the filling. In that way, swirling motion of the water inside the filling can be obtained, as such jets relate to a relatively large inflow velocity of the pressurized water through the apertures.

It may be clear that permeability of the first permeable layer is at least caused by the apertures, so that, optionally, the first permeable layer may be an otherwise impermeable substrate.

According to the objective of providing an improved pad, the invention also provides a pad for producing a chocolate beverage such as a chocolate drink, provided with a first permeable layer and a second permeable layer opposite to the first permeable layer, further provided with a filling arranged in between the first and the second permeable layer, wherein the pad is arranged for receiving pressurized, and preferably hot, water through the first permeable layer, for dissolving, dispersing, and/or extracting at least part of the filling in the received pressurized water, and for releasing through the second permeable layer the water with the at least part of the filling dissolved, dispersed, and/or extracted therein, wherein the filling has a weight of at least 11 gram, preferable at least 13 gram, more preferably at least 15 gram and contains a chocolate ingredient, and wherein, in use, a solubility of the filling preferably is at least 60 weight percent, more preferably at least 80 weight percent. Such a solubility may be obtained by proper adapting of the granular structure of the filling. For example, a grain size may be adjusted to be in a range wherein the solubility is achieved. It may be clear to the skilled person that the solubility is also dependent on the properties of the pad, such as a permeability and composition of the second permeable layer, and a thickness of the filling measured in a direction transverse to the first and second permeable layer.

In addition, the solubility is dependent on a pressure and temperature of the, preferably hot, water.

Experiments performed by the inventor showed that, in particular, the combination of the filling having a weight of at least 15 gram, and the solubility being at least 80 weight percent, yields a chocolate beverage of high quality. A higher weight of the filling can promote the solubility.

Preferably, the first permeable layer of the pad for producing the chocolate beverage has a plurality of apertures for receiving the pressurized water, which apertures have a size dimensioned for establishing swirling motion of the water inside the filling. In this way, one or more advantages of the pad for producing the beverage can also be obtained for the pad for producing the chocolate beverage. Such apertures promote reaching a high solubility, for example the solubility of at least 60 weight percent or the solubility of at least 80 weight percent.

Further embodiments and variations may relate to one or both of the pad for producing a chocolate beverage and the pad for producing a beverage.

In an embodiment, the filling contains a milk ingredient, for example milk powder, and preferably contains a flavour ingredient. In this way, a milk-based, and preferably flavoured, beverage can be obtained. In an embodiment, the filling contains a coffee ingredient, such as roasted and grounded coffee, or instant coffee. Preferably, the filling contains both the coffee ingredient and the milk ingredient. The filling containing the coffee ingredient without any milk ingredient is considered equally valuable. In an embodiment, the chocolate ingredient is, at least partly and possibly completely, replaced by the milk ingredient and/or the coffee ingredient. It has been found that also these possibilities for the filling may benefit from one or more advantages of the invention. It is recognised though that beverages that contain coffee, or milk and coffee (such as cappuccino), can alternatively be made with pads that are not according to the invention.

Preferably, a dimension, such as a diameter, of individual apertures of the plurality of apertures is in a range from 0.2 millimeter to 0.5 millimeter. It was found experimentally by the inventor that apertures dimensioned in this way, lead to efficient swirling. Preferably, the apertures have a circular shape. Alternatively, the apertures may have a rectangular shape. Then, the dimension of the individual apertures may be a width or length of the individual apertures. Alternatively, the apertures may have an approximately ellipsoidal shape. Then, the dimension of the individual apertures may be a minimum diameter or a maximum diameter of the individual apertures. It may be clear that other shapes of the apertures are possible as well.

In an embodiment, a total number of the plurality of apertures is arranged for establishing swirling motion of the water inside the filling. It was recognised by the inventor that the total number of apertures also influences the inflow flowrate through the apertures, as the received amount of water is distributed over the total number of apertures of the pad.

Preferably, the total number of the plurality of apertures is in a range from 30 to 70, and preferably is about equal to 50. It was found experimentally by the inventor that, if the total number of apertures is within this range, efficient swirling can be obtained, especially if the dimensions, such as the diameters, of the individual apertures are in the range from 0.2 millimeter tot 0.5 millimeter.

In an embodiment, the first permeable layer is substantially impermeable outside the apertures. Preferably, so that the first permeable layer is closed except for the apertures. This may intensify a strength of the swirling, as the pressurized water can only enter the pad via the apertures, so that the inflow flowrate is further increased. However, alternatively, there may be an additional permeability through the first permeable layer outside the apertures. It may be clear that preferably, in use, a flowrate enabled by this additional permeability is much smaller than the inflow flowrate through the apertures.

In an embodiment, the pad is provided with a separating structure that forms walls that extend from the first permeable layer to the second permeable layer and form flow channels that are mutually separated by the walls, wherein an individual flow channel extends from at least one aperture of the plurality of apertures to the second permeable layer. For example, one flow channel is in fluidum connection with the at least one aperture. Thus, one or more apertures may give entrance to one flow channel. The walls can promote that swirling water, that in use is deflected in a direction approximately parallel with the first and second permeably layer, will be further deflected in a direction back towards the first permeable layer. In this way, dissolving, dispersing, and/or extracting within the pad is further promoted. By combining the plurality of apertures with the separating structure, a rather efficient way of dissolving, dispersing, and/or extracting the at least part of the filling in the water is enabled.

Preferably, a cross-sectional area per individual flow channel, measured in parallel with the first and/or second permeable layer, is in a range between 0.6 and 1.2 square centimeter. It was found experimentally by the inventor that in this way efficient swirling can be achieved.

In an embodiment, the walls of the separating structure are provided with a plurality of recesses adjacent to the second permeable layer. It was experimentally found by the inventor that in this way more of the filling can be dissolved, dispersed, and/or extracted in the beverage that is released from the pad, i.e. a higher brewing yield, or, in other words, a higher solubility, can be obtained.

Preferably, the recesses have a depth along the walls of the flow channels that is in a range from 1 millimeter to 4 millimeter. This range was found to give an optimal improvement of the brewing yield, i.e. of the solubility.

In an embodiment, the separating structure forms a pad side wall. In this way, it can be prevented that, in use, the filling will at least partly move out of the separating structure. However, this may go at the expense of the solubility of the filling. Therefore, the recesses are especially valuable in this embodiment.

In an embodiment, entrance of the pressurized water to individual flow channels is provided by at most five apertures per flow channel, preferably by at most two apertures per flow channel, more preferably by at most one aperture per flow channel. If a number of apertures per flow channel becomes too large, an intensifying effect of the walls of the separating structure that forms the flow channel decreases. This decrease is stronger for relatively large holes, while this decrease is weaker for relatively small holes.

In an embodiment, the apertures have a size dimensioned for establishing swirling motion of the water inside the filling, while a pressure of the water near, such as directly before, the first permeable layer minus a pressure of the beverage near, such as directly after, the second permeable layer, is in a range from 0.2 to 2.0 bar, and preferably is in a range from 0.4 to 1.7 bar, more preferably about 0.4 bar, about 1.2 bar, about 1.4 bar, or about 1.7 bar. At least one of such pressure differences may be reached by means of a coffee machine of the Senseo brand.

According to an aspect of the invention, the pad is arranged for producing a chocolate beverage. This aspect is considered to be of particular importance. On the one hand, chocolate beverages are likened by many people throughout the world. On the other hand, chocolate beverages are rather difficult to obtain, in particular from a dry filling. Therefore, a pad according to the invention is especially suitable for producing a chocolate beverage.

In an embodiment, the pad, in a direction perpendicular to the first and second permeable layer, has a thickness of at least 15 millimeter, preferably of at least 17 millimeter. Compared to known pads, such a large thickness is exceptional. Choosing such a thickness is surprising, because such a pad does not fit in known pad holders of coffee machines, in particular the well known and popular coffee machines of the Senseo brand. On the other hand, this thickness contributes to a stronger taste of the beverage, especially of a chocolate beverage.

Preferably, the filling is a dry filling. Preferably, the dry filling has a granular structure. A pad having a dry filling does not have to be impermeable to water, moisture, and other liquids during storage. A liquid filling however requires a protection that needs to be removed or opened, before a beverage can be made. This would require consumer handling, which leads to lower convenience and chances of mistakes. An example of a liquid product is the known 'Chocomel Hot' product. A capsule of the 'Chocomel Hot' product contains a liquid concentrate, and needs to be opened at the top before use, by removing a lid and by piercing the bottom while placing the capsule in a dedicated capsule holder.

It is a further object of the invention to provide an improved pad holder.

Accordingly, the invention provides a pad holder provided with a cavity for receiving a pad according to the invention. By using such a pad holder, one or more advantages of a pad according the invention can be realised.

In an embodiment, the cavity is arranged for receiving the pad with the second permeable layer facing a bottom part of the cavity, wherein a depth of the cavity in a direction perpendicular the second permeable layer is at least 15 millimeter, preferably at least 17 millimeter. Choosing this depth is surprising, because such a pad holder is rather different from known pad holders of known coffee machines, in particular the well known and popular coffee machines of the Senseo brand. By applying the depth of at least 15 millimeter, preferably at least 17 millimeter, the pad having a filling with a weight of at least 11 gram, preferable at least 13 gram, more preferably at least 15 gram, containing the chocolate ingredient, fits in the pad holder. Such a fit would not be obtained when using a conventional pad holder.

In an embodiment, the bottom part of the cavity is provided with an outlet for guiding the beverage after it has left the pad, wherein the pad holder is provided with an element for beating air into the water after it has left the pad and the outlet, wherein the element has a length, measured in a direction transverse to the bottom part of the cavity, of at most 17 millimeter. In this way, the pad holder can accommodate the pad and still is compatible with a coffee machine of the Senseo brand.

It is a further object of the invention to provide an improved assembly.

Accordingly, the invention provides an assembly of a pad according to the invention, a pad holder according to the invention, and/or a coffee machine. The coffee machine may be the well known and popular coffee machine of the Senseo brand. Various types of this coffee machine are known to the skilled person.

In an embodiment, the cavity has a cavity side wall and the pad has a pad side wall that connects the first permeable layer and the second permeable layer, wherein a, preferably impermeable, portion of the pad side wall that is adjacent to a portion of the cavity side wall when in use the pad is received by the cavity, has a curvature that is, preferably slightly, higher than a curvature of the portion of the cavity side wall. As a result of the pressurized water, the pad may in use be pressed against the cavity side wall. Because in this embodiment the curvature of the pad side wall is slightly higher that the curvature of the cavity side wall, a, relatively small, first contact area between the pad side wall and the cavity side wall may exist. As the pad is pressed against the cavity side wall and is supported in the relatively small first contact area, a relatively high pressure will be exerted on the first contact area. This can result in a good seal. In this embodiment, the curvature of the pad side wall is preferably only slightly larger than the curvature of the cavity side wall. As a result, a distance between the cavity side wall and the pad side wall outside the first contact area is still relatively small. Thus, a flow resistance along part of the cavity side wall out of the first contact area is still relatively large. Preferably, the distance between the cavity side wall and the pad side wall is, in use, at most 3 millimeter, preferably at most 2 millimeter, more preferably at most 1 millimeter, for example at most 0.5 millimeter.

Preferably, the portion of the pad side wall and the portion of the cavity side wall are located near the second permeable layer. The cavity side wall preferably has a convex shape. Because of this, a sealing pressure on the first contact area between the pad side wall and the cavity side wall is highest near the second permeable layer. In that way a better seal can be obtained.

In an embodiment, the pad is provided with a, preferably circular, projection near the first permeable layer, wherein a top part of the cavity is provided with a cavity recess that is dimensioned for, in use, receiving the projection. In this way a seal can be obtained near the first permeable layer.

In an embodiment, the pad side wall is formed by the separating structure. This is considered a convenient way of forming the pad side wall. If in this embodiment the separating structure is, along the pad side wall, covered by another layer, the separating structure is still considered to form the pad side wall.

It is another objective of the invention to provide an improved method of producing beverages that benefit from enhanced dissolving, dispersing, and/or extracting of the filling.

Accordingly, the invention provides a method of producing a beverage, preferably a chocolate beverage, by using a pad provided with a first permeable layer and a second permeable layer opposite to the first permeable layer, further provided with a filling arranged in between the first and the second permeable layer, the method including the steps: —receiving pressurized, and preferably hot, water through a plurality of apertures in the first permeable layer; —dissolving, dispersing, and/or extracting at least part of the filling in the received pressurized water; —releasing through the second permeable layer the water with the at least part of the filling dissolved, dispersed, and/or extracted therein; —establishing swirling motion of the water inside the filling, enabled by dimensioning a size of the apertures and/or by adapting a total number of the plurality of apertures. In this way, a thought of the inventor can be realised, i.e. that by intensifying flow of the water inside the pad, the at least part of the filling can be better dissolved, dispersed, and/or extracted in the water.

The invention also provides a method of producing a chocolate beverage, by using a pad provided with a first permeable layer and a second permeable layer opposite to the first permeable layer, the method including the steps: —providing the pad with a filling arranged in between the first and the second permeable layer, which filling has a weight of at least 11 gram, preferable at least 13 gram, more preferably at least 15 gram and contains a chocolate ingredient; —receiving pressurized, and preferably hot, water through the first permeable layer; —dissolving, dispersing, and/or extracting at least part, preferably at least 60 weight percent and/or at least 80 weight percent, of the filling in the received pressurized water; —releasing through the second permeable layer the water with the at least part of the filling dissolved, dispersed, and/or extracted therein. Preferably, the method further includes producing the chocolate beverage by means of a coffee machine of the Senseo brand. In this way, an inventive thought can be realised, i.e. that by providing a filling that is surprisingly heavy for the coffee machine, more chocolate ingredient can be dissolved, dispersed, and/or extracted in the water.

BRIEF DESCRIPTION OF THE DRAWINGS

The invention will now be described, in a non-limiting way, with reference to the accompanying drawings, in which.

Unless stated otherwise, like reference numerals refer to like elements throughout the drawings.

DETAILED DESCRIPTION

Figure 1:
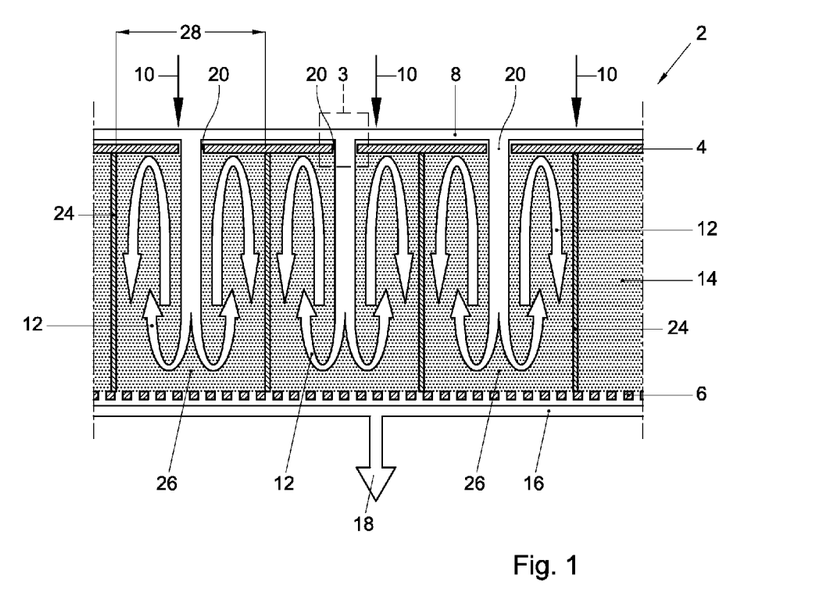
FIG. 1 shows part of a pad for producing a beverage.
Figure 1A:
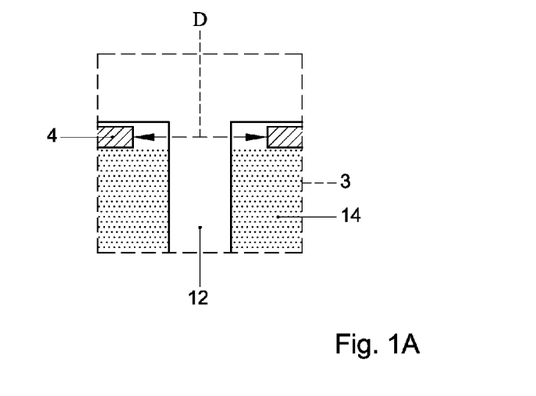
FIG. 1A shows a detail of a pad.
Figure 2:
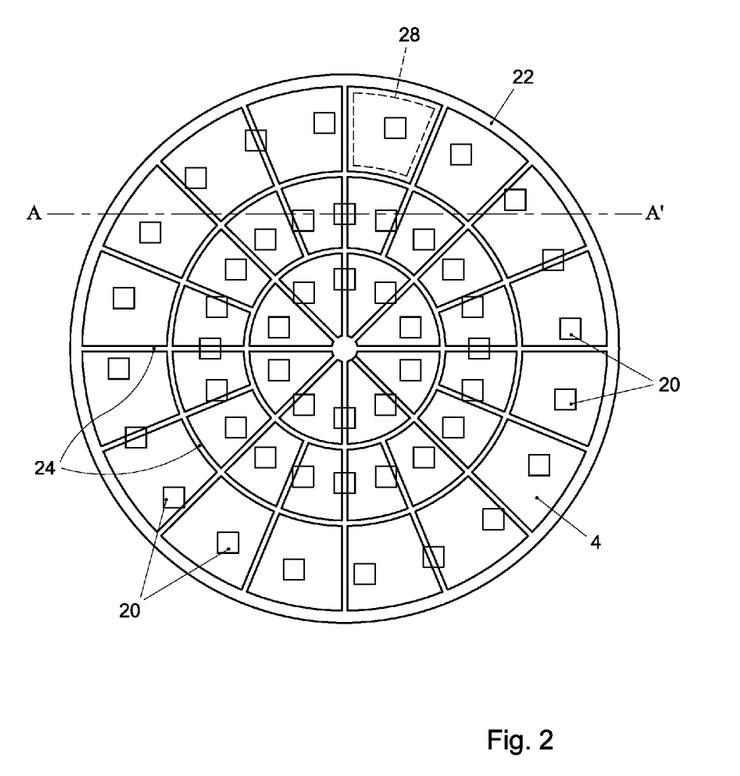
FIG. 2 shows a top view of a pad.

FIG. 1 shows part of cross section of a pad 2 for producing a beverage, in a first embodiment according to the invention. FIG. 1A shows a detail 3 of the pad 2. FIG. 2 shows a top view of the pad 2. In FIG. 2, the cross section of FIG. 1 is indicated by line A-A'. The pad 2 has a first permeable layer 4 and a second permeable layer 6 opposite to the first permeable layer 4. The pad 2 is arranged for receiving pressurized water 8 through the first permeable layer. A flow direction of the pressurized water 8 before it has entered the pad, is indicated by arrows 10.

In use, the pressurized water 8 flows through the pad 2. Flow lines of the water 8 inside the pad are indicated with arrows 12. During this flow, at least part of a filling 14 of the pad 2 is dissolved, dispersed, and/or extracted in the water 8. The water 8, with the at least part of the filling dissolved, dispersed, and/or extracted therein, is subsequently released through the second permeable layer 6. (It may be clear that some of the water 8 may remain inside the pad 2.) Thus, a beverage 16, such as a drink, can be obtained. In use, the beverage 16 flows towards a cup (this flow is indicated by arrow 18), so that the beverage 16 can be consumed by a user of the pad 2.

Contrary to conventional pads, the first permeable layer 4 is provided with a plurality of apertures 20 for receiving the pressurized water 8. In the first embodiment, the first permeable layer 4 is closed except for the apertures 20. This may be achieved for example by manufacturing the first permeable layer by providing apertures in an otherwise impermeable substrate. Then, the apertures 20 cause the permeability of the first permeable layer 4. It is not excluded however that the first permeable layer is permeable outside the apertures 20 as well. This can be the case when the first permeable layer 4 is made from a material that has some permeability by itself. Then, the permeability of the first permeable layer 4 is not exclusively caused by the apertures 20. Preferably, however, the permeability of the first permeable layer 4 is for the largest part caused by the apertures 20.

In general, the first permeable layer 4 outside the apertures 20 may include a paper layer covered with a polypropylene layer. In between the paper layer and the polypropylene layer, a polyester layer may be provided. Preferably, the polypropylene layer forms an outer surface of the first permeable layer 4. The outer surface of the first permeable layer 4 may form an outer surface of the pad 2. By using such materials for the first permeable layer 4, closure of the first permeable layer 4 outside the apertures 20 may be achieved.

The second permeable layer may, in general, be similar to and/or include a similar material as the first permeable layer. This may facilitate a manufacturing process of the pad 2. However, alternatively, the second permeable layer may be different from and/or include a different material than the first permeable layer.

The apertures 20 have a size dimensioned for establishing swirling motion of the water 8 inside the filling. Such swirling motion is schematically indicated in FIG. 1 by the curved arrows 12. By such swirling flow, better dissolving, dispersing, and/or extracting of the at least part of the filling 14 in the received pressurized water 8 is achieved. As a result, a larger part of the filling 14 ends up is the drink 16, instead of being left in the pad 2. It is noted that the term 'swirling motion' is not limited to a flow pattern as indicated by the curved arrows 12. Instead, the term 'swirling motion' may cover many other flow patterns as well, which flow patterns may deviate significantly from a rather uniform flow from the first permeable layer 4 to the second permeable layer 6. Flow of the water 8 in the filling 14 may be jet-like in a vicinity of the apertures 20, and be swirling further away from the apertures. Experiments performed by the inventor showed that swirling motion may be achieved when a diameter D of individual apertures of the plurality of apertures is in a range from 0.2 millimeter to 0.5 millimeter. In the first embodiment, the apertures have a circular shape with a diameter in the range from 0.2 millimeter to 0.5 millimeter. Other shapes and diameters are not excluded however.

In the first embodiment, a total number of the plurality of apertures 20 is arranged for establishing swirling motion of the water inside the filling 14. The total number may for example be visible in a top view of the pad 2, as is shown in FIG. 2. Experiments performed by the inventor showed that swirling motion can be achieved when the total number of the plurality of apertures 20 is in a range from 30 to 70, and preferably is about equal to 50.

When dimensioning the diameter D of the apertures 20 and the total number of the apertures 20 of the pad 2 for establishing swirling motion, a certain value of a pressure difference over the pad 2 has to be used. As a result of this pressure difference, the water 8 is forced through the pad 2. The pressure difference can be defined as a pressure of the water 8 near, such as directly before, the first permeable layer 4 minus a pressure of the drink 16 near, such as directly after, the second permeable layer 6. For dimensioning the diameter D of the apertures 20 and the total number of apertures 20 of the pad 2 in the first embodiment, the pressure difference can be in a range from 0.2 to 2.0 bar. Preferably, the pressure difference is in a range from 0.4 to 1.4 bar. For example, the pressure difference is near 0.4 bar, near 1.2 bar, near 1.4 bar, or near 1.7 bar. All such pressure differences can be used for dimensioning the apertures 20, and for arranging the total number of the apertures 20 for one pad 2. Most conveniently, the pressure difference that is normally delivered by a coffee machine of the Senseo brand is used for dimensioning the diameter D of the apertures 20 and the total number of apertures 20 for establishing the swirling motion.

In a second embodiment according to the invention, the pad 2 is arranged for producing a chocolate drink. The pad in the second embodiment is provided with the first permeable layer 4 and the second permeable layer 6 opposite to the first permeable layer 4. The pad 2 is further provided with the filling 14 arranged in between the first permeable layer 4 and the second permeable layer 6. Analogously to the pad 2 in the first embodiment, the pad 2 in the second embodiment is arranged for receiving the pressurized water 8 through the first permeable layer 4. By means of the received pressurized water 8, at least part of the filling 14 can be dissolved, dispersed, and/or extracted. In use of the pad 2 in the second embodiment, the pressure difference over the pad 2 may be similar as in use of the pad 2 in the first embodiment. Such a pressure difference may be equal to the pressure difference normally employed in the coffee machine of the Senseo brand. After forming the drink 16 by dissolving, dispersing, and/or extracting the at least part of the filling 14 in the water 8, the drink is released through the second permeable layer. It may be clear that part of the drink and/or the received water 8 may remain inside the pad 2.

In the second embodiment, the filling 14 has a weight of at least 15 gram and contains a chocolate ingredient. In this way the pad 2 can be arranged for forming the chocolate drink 16. However, a weight of at least 11 gram or at least 13 gram may for example be possible as well. In the second embodiment, a solubility of the filling may be at least 80 weight percent. However, a solubility of the filling may be at least 60 weight percent as well. Such a solubility is determined at conditions, such as temperature and pressure, that are normally encountered in a pad in the coffee machine of the Senseo brand (for example an absolute pressure between 1 and 2 bar and a temperature of about 80-95 degrees Celsius). In general, the solubility is most conveniently determined by the coffee machine of the Senseo brand itself. Then, the solubility of the filling corresponds with the weight percentage of the filling that ends up in the beverage. Thus, the solubility equals the weight of the part of the filling that in use is removed out of the pad by the hot water, divided by the weight of the filling before use. It may be clear that not all of the filling that in use is removed from the filling and ends up in the beverage needs to be dissolved in the hot water, but that part of it may be dispersed therein.

It may be clear that properties of the pad 2 in the first and second embodiment can be advantageously combined. Then, the pad 2 in the first embodiment for example has the filling 14 of at least 15 gram, which contains the chocolate ingredient. Additionally or alternatively, the first permeable layer 4 of the pad 2 in the second embodiment may have the plurality of apertures 20 for receiving the pressurized water 8, which apertures 20 have the size dimensioned for establishing the swirling motion of the water inside the filling 14.

Figure 3:
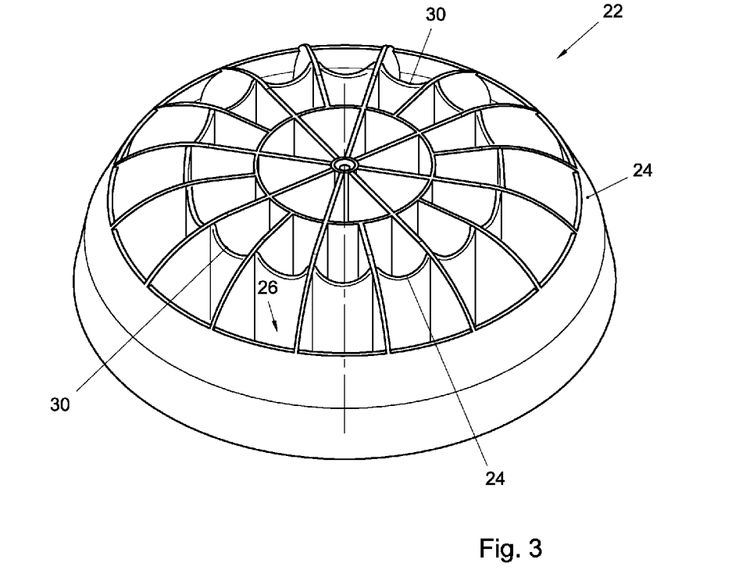
FIG. 3 shows an example of a separating structure.
Figure 3A:
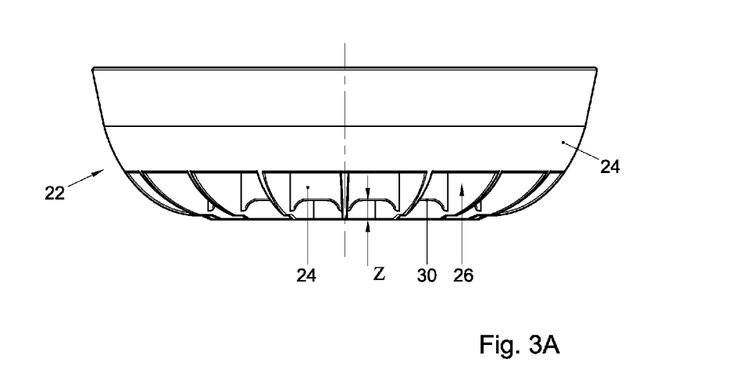
FIG. 3A shows a side view of a separating structure.

In a variation of the first and/or second embodiment, the pad 2 is provided with a separating structure 22. FIG. 3 shows an example of the separating structure 22. FIG. 3A shows a side view of the separating structure 22. Note that the separating structure 22 is also visible in FIGS. 1 and 2, but that it is not necessarily included in the pad 2 in the first embodiment. From FIG. 1 it is clear that the separating structure 22 forms walls 24 that extend from the first permeable layer 4 to the second permeable layer 6. It is also clear from the flow lines 12 in the pad 2 indicated in FIG. 1, that the separating structure 22 forms flow channels 26 that are mutually separated by the walls 24.

With reference to FIGS. 1 and 2, a cross-sectional area 28 can be defined for an individual flow channel 26. The cross-sectional area 28 is measured in a direction that is parallel with the first permeable layer 4 and/or the second permeable layer 6. In the example of FIGS. 1 and 2, the cross-sectional area 28 of at least one of the flow channels 26 is in the range between 0.6 and 1.2 square centimeter. In general, the cross-section area 28 of a majority of the flow channels 26 is in this range. In the experiments performed by the inventor, it was found that good dissolving, dispersing, and/or extracting of the at least part of the filling 14 can be obtained when the cross-sectional area 28 is within the range between 0.6 and 1.2 square centimeter.

FIGS. 3 and 3A show that the walls 24 of the separating structure 22 are provided with a plurality of recesses 30. Note that not each individual wall is provided with one of the recesses 30, but that some of the walls 24 are free of a recess 30. With the separating structure 22 being included in the pad 2, the recesses 30 are positioned adjacent to the second permeable layer 6. In the example of FIG. 3, the recesses have a depth Z, indicated in FIG. 3A, along the walls 24 of the flow channels 26 that is in a range from 1 millimeter to 4 millimeter, typically 2 millimeter, for example 2.2 millimeter. The depth Z being around 2 millimeter was found to give an optimum brewing yield. For the variation of the pad in the first and second embodiment that is provided with the separating structure 22, it may be clear that, in order to receive a substantial amount of the pressurized water 8, an individual one of the flow channel 26 extends from at least one aperture 20 of the plurality of apertures 20 to the second permeable layer 6. This holds true for most of the flow channels shown in FIG. 2. For example, the at least one aperture 20 may, in use, be positioned above the flow channel 26. More in general, entrance of the pressurized water 8 to individual flow channels 26 is provided by at most five apertures 20 per flow channel 26, preferably by at most two apertures 20 per flow channel 26, more preferably by at most one aperture 20 per flow channel 26. From the swirling flow lines 12 shown in FIG. 1, it is clear that the walls 24 of the flow channel 26 can influence swirling. Without wanting to be bound by any theory, it can be expected that, initially, the water 8 flows into the apertures 20 in a direction towards the second permeable layer 6. However, when flow is hindered by the filling 14 and/or by the second permeable layer 6, the water 8 can be expected to flow sidewards as well. Then, flow of the water 8 can be expected to be hindered by the walls 24. Subsequently, at least some of the water can be expected to flow back in a direction towards the first permeable layer 4. In this way, the separating structure 22 may intensify the swirling. As a result, an amount of the filling that is dissolved, dispersed, and/or extracted in the water 8, may be increased. It may thus be understood that, if entrance of the pressurized water is provided by too many, e.g. more than five or more than ten, apertures 20, an intensifying effect of the walls 24 on the swirling may be significantly decreased.

An additional general advantage of the separating structure 22 is that it can promote a uniform distribution of the pressurized water 8 over the pad 2. Channeling, i.e. the occurrence of one, rather narrow, flow path from the first permeable layer to the second permeable layer, can be substantially prevented by using the separating structure 22. Such channelling may start by locally dissolving and/or dispersing the filling by the pressurized water 8. This may significantly increase flow of the pressurized water near a position where the local dissolving and/or dispersing has taken place, as a flow resistance is diminished at that position. The increased flow may further increase the local dissolving and/or dispersing, which may further diminish the flow resistance at that position, and so on. As a result, one, rather narrow, flow path may develop. Such channels may occur at one or a few other positions as well, but, as a result of channeling, a large part of the filling may not end up in the beverage so that a rather watery beverage may be obtained. By means of the, plurality of, flow channels 26, an amount of flow paths can be created that is similar to a total number of the flow channels 26. In general, the total number of flow channels 26 for example is in a range from 20 to 60, for example typically 40.

Figure 4:
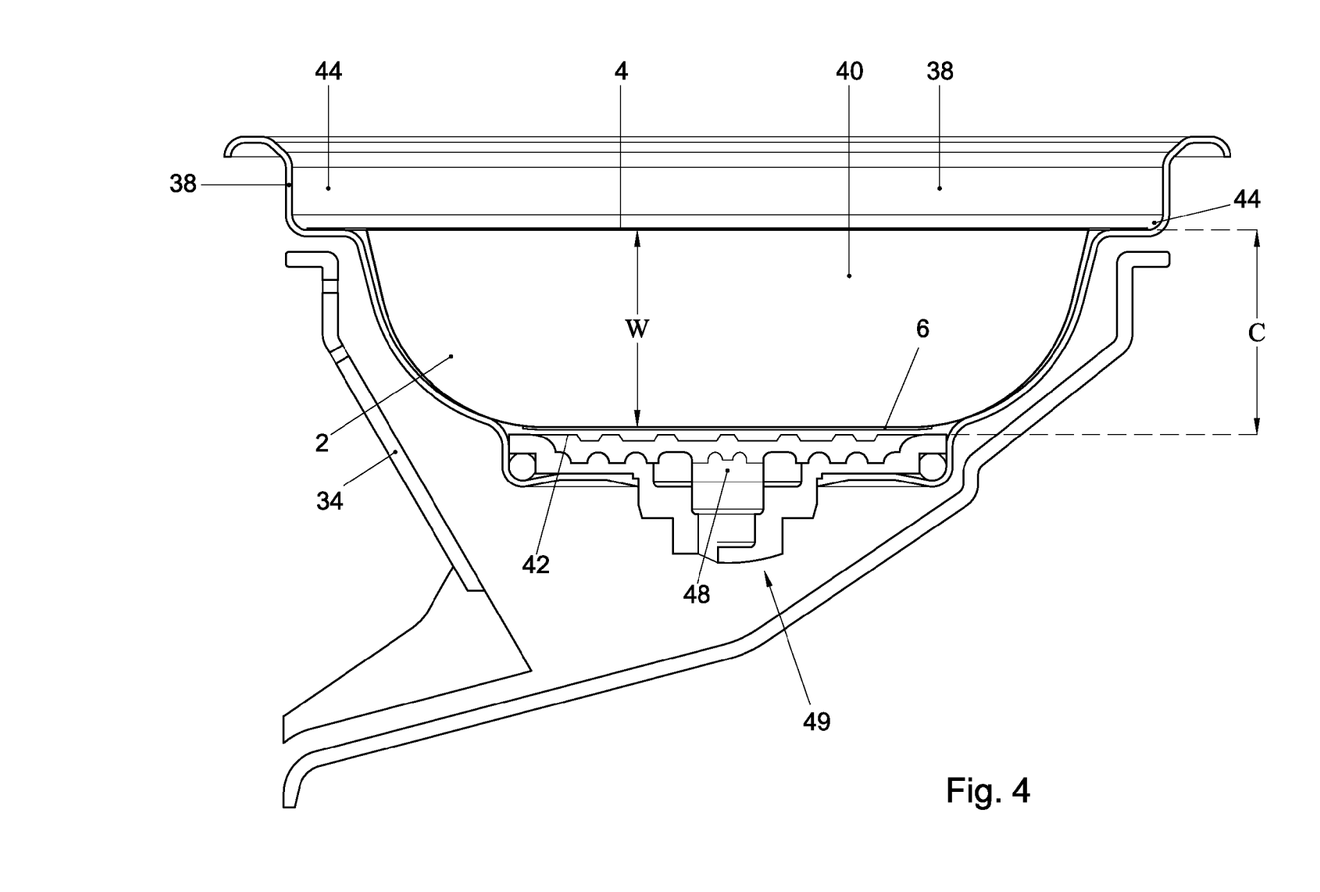
FIG. 4 shows a pad, a pad holder, and a part of a coffee machine.
Figure 5:
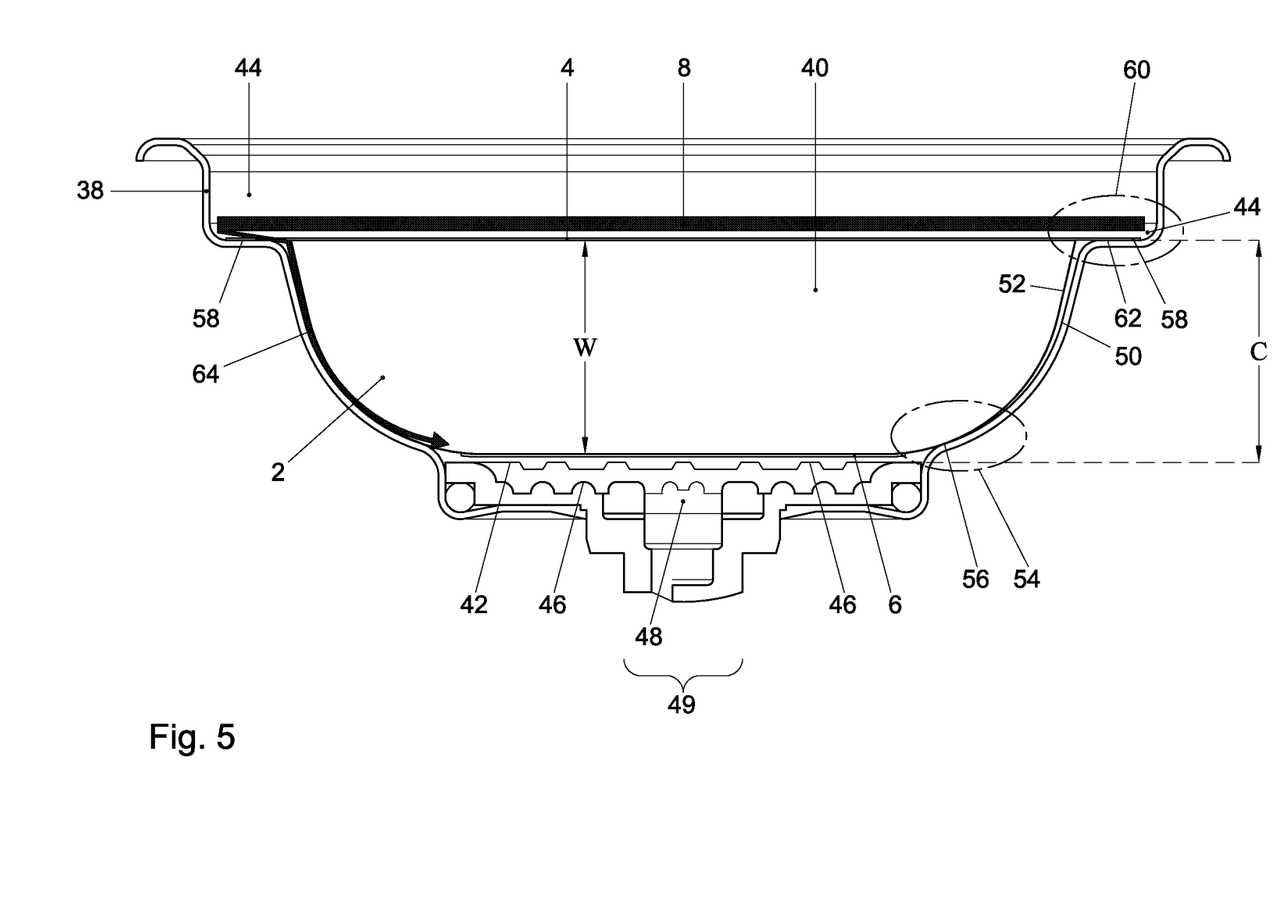
FIG. 5 shows a pad and a pad holder.

FIGS. 4 and 5 show a pad holder 38 in an embodiment according to the invention. The pad holder 38 fits in the coffee machine of the Senseo brand. A part of this coffee machine is shown in FIG. 4, with reference number 34. The pad holder 38 has a cavity 40 for receiving the pad 2 in the first embodiment, the second embodiment, or a variation thereof. The pad holder 38 is arranged for receiving the pad 2 with the second permeable layer 6 facing a bottom part 42 of the cavity 40. A depth C of the cavity 40 in a direction perpendicular the second permeable layer 6 may be at least 17 millimeter, preferably about 18 or about 19 millimeter. The depth C is measured from a level of a cavity recess 44 in the cavity 40 to a highest level of the bottom part 42 of the cavity 40. The highest level of the bottom part 42 of the cavity 40 may be formed by a top of projections 46 of the bottom part 42.

FIGS. 4 and 5 also shows the pad 2 in the first or the second embodiment. The pad 2 may have, measured from the outer surface of the first permeable layer 4 to an outer surface of the second permeable layer 6 in a direction perpendicular to the first and/or second permeable layer 4, 6, a thickness W of at least 17 millimeter, for example about 17.2 millimeter or about 17.6 millimeter.

In the example of FIGS. 4 and 5, the (bottom part of the) cavity is provided with an outlet 48 for guiding the water after it has left the pad. In addition, the pad holder may be provided with an element for beating air into the chocolate beverage after it has left the pad and the outlet. Thereto, more in general, the outlet 48 may be connected with a collecting unit 49 of the pad holder 38. The collecting unit 49 is provided with an impact element and a chamber. When the beverage flows out of the outlet 48, it may hit the impact element and subsequently may impact against inner walls of the chamber. In this way, air can be beaten in the beverage. This may give a fine-bubble foam layer on the beverage. This is liked by many users, especially for chocolate drinks Structure and working of the collecting unit 49 is described i.a. in EP 1,371,311. It will be appreciated that, in comparison with known pad holders for the coffee machine of the Senseo brand, a dimension of the collecting unit 49 measured in a direction perpendicular to the bottom part 42 of the cavity 40 of the pad holder 38, is significantly decreased, preferably decrease by at least 3 millimeter, for example decreased by about 3.7 millimeter. In this way the pad 2 with the thickness W of at least 17 millimeter fits in the pad holder 38.

Figure 5A:
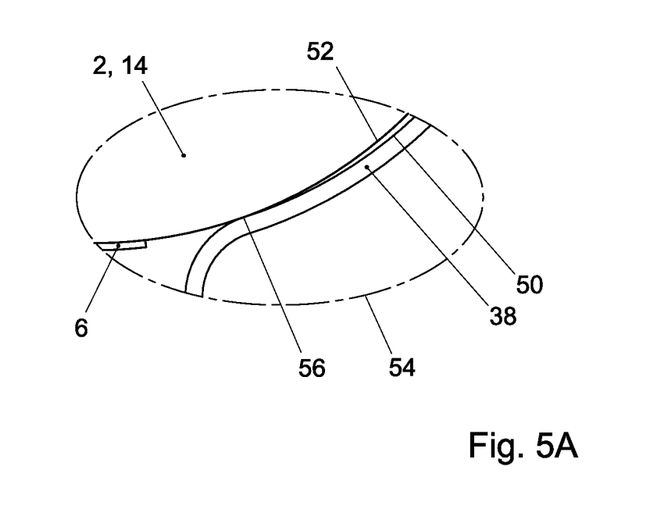
FIG. 5A shows a first detail of an assembly of a pad and a pad holder.

The pad 2 and the pad holder 38 of FIGS. 4 and 5 form an assembly in an embodiment according to the invention. The cavity 40 has a cavity side wall 50, shown in FIG. 5. The pad 2 has a pad side wall 52 that connects the first permeable layer 4 and the second permeable layer 6. In use, when the pad 2 is received by the cavity 40, an impermeable portion of the pad side wall 52 may be adjacent to a portion of the cavity side wall 50. In the example of FIG. 5, both these portions are indicated by means of a first detail 54 of the assembly, which is also shown in FIG. 5A. FIGS. 5 and 5A show that a curvature of the impermeable portion of the pad side wall 52 is slightly higher than a curvature of the portion of the cavity side wall 50. In this way, an effective seal can be obtained in a first contact area 56 between the impermeable portion of the pad side wall 52 and the portion of the cavity side wall 50. In FIGS. 4 and 5, the impermeable portion of the pad side wall 52 and the portion of the cavity side wall 50 are located near the second permeable layer 6. The pad side wall 52 may be formed by the separating structure 22. In this way a good seal can be obtained on the first contact area 56.

Figure 5B:
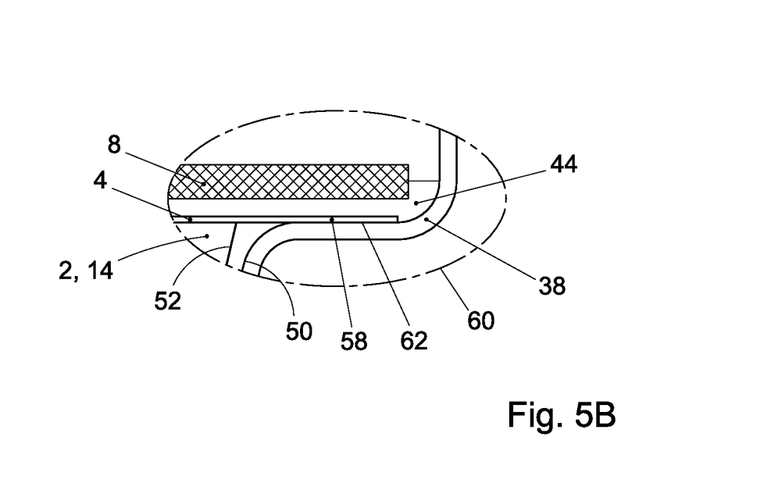
FIG. 5B shows a second detail of an assembly of a pad and a pad holder.

In a variation, the pad 2 may be provided with a, preferably circular, projection 58 near the first permeable layer 4. Preferably, the cavity recess 44, provided in a top part of the cavity 40, is dimensioned for receiving the projection 58. This is further illustrated in FIG. 5B, which shows a second detail 60 of the assembly of the pad 2 and the pad holder 38, indicated in FIG. 5. When, in use, the pressurized water 8 is received by the pad 2, the projection 58 can be pushed against the wall of the pad holder in the cavity recess 44. In this way, a second contact area 62 between the pad 2 and the pad holder 38 is obtained which, in use, will form a seal as well.

By having sealing contact between the pad 2 and the pad holder 38 at the first contact area (i.e. near a bottom part of the cavity 40) and the second contact area (i.e. near a top part of the cavity 40), bypass of the pressurized water 8 in between the pad 2 and the pad holder 38 can be largely prevented. Such bypass is schematically indicated in FIG. 5 by arrow 64.

The pad 2, the pad holder 38, and/or the coffee machine 34 can be used in a first embodiment of a method according to the invention (the first method). The first method may include producing the beverage, preferably the chocolate beverage, by using the pad 2 provided with the first permeable layer 4 and the second permeable layer 6 opposite to the first permeable layer 4, which pad 2 is further provided with the filling 14 arranged in between the first permeable layer 4 and the second permeable layer 6. The first method includes receiving the pressurized water 8 through the plurality of apertures 20 in the first permeable layer. In the first method, at least part of the filling 14 is dissolved, dispersed, and/or extracted in the received pressurized water 8. Subsequently, the first method includes releasing through the second permeable layer 6 the beverage, i.e. the water 8 with the at least part of the filling 14 dissolved, dispersed, and/or extracted therein. The first method further includes establishing swirling motion of the water inside the filling. This is enabled by dimensioning a size, e.g. the diameter D, of the apertures 20 and/or by adapting the total number of the plurality of apertures 20 in the pad 2.

Additionally or alternatively, the pad 2, the pad holder 38, and/or the coffee machine 34 can be used in a second embodiment according to the invention (the second method). The second method may include producing the chocolate drink 16, by using the pad 2 provided with the first permeable layer 4 and the second permeable layer 6 opposite to the first permeable layer 4. The second method includes providing the pad 2 with the filling 14 arranged in between the first and second permeable layer, which filling 14 has a weight of at least 11 gram, preferably at least 13 gram, more preferably at least 15 gram and contains the chocolate ingredient. Preferably, the filling contains at least 11 gram, more preferably at least 13 gram, in particular at least 15 gram of the chocolate ingredient. In the second method, the pressurized water 8 is received through the plurality of apertures 20 in the first permeable layer 4. The second method may further include the step of dissolving, dispersing, and/or extracting at least 50 weight percent, preferably at least 65 weight percent, more preferably at least 80 weight percent of the filling 14 in the received pressurized water. In this way the chocolate drink 16 can be formed. The second method may further include releasing through the second permeable layer 6 the chocolate drink 16, which contains the water with at least 60 weight percent, preferably at least 80 weight percent of the filling 14 dissolved, dispersed, and/or extracted therein.

It is also important to note that the construction and arrangement of the elements of the pad, pad holder, assembly, and method for producing a beverage as shown in the preferred and other exemplary embodiments are illustrative only. The invention is not limited to any embodiment herein described and, within the purview of the skilled person, modifications are possible which may be considered within the scope of the appended claims. Equally all kinematic inversions are considered inherently disclosed and to be within the scope of the present invention. The use of expressions like: "preferably", "more preferably", "in particular", "typically", "especially", etc. is not intended to limit the invention. The indefinite article "a" or "an" does not exclude a plurality. Features which are not specifically or explicitly described or claimed may be additionally included in a product or a method according to the present invention without deviating from its scope.

Although only a few embodiments of the present invention have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the claims. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and/or omissions may be made in the design, operating conditions and arrangement of the preferred and other exemplary embodiments without departing from the spirit of the present invention as expressed in the appended claims.

What is claimed is:

1. A pad for producing a beverage, the pad comprising
a first permeable layer;
a second permeable layer opposite to the first permeable layer;
a filling arranged in between the first permeable layer and the second permeable layer;
wherein the pad is arranged for receiving pressurized water through the first permeable layer, for dissolving, dispersing, and/or extracting at least part of the filling in the received pressurized water, and for releasing through the second permeable layer the water with the at least part of the filling dissolved, dispersed, and/or extracted therein to produce a beverage;
wherein the first permeable layer has a plurality of apertures for receiving the pressurized water, the apertures configured to establish swirling motion of the water inside the filling;
further comprising a separating structure comprising walls that extend from the first permeable layer to the second permeable layer and form flow channels that are mutually separated by the walls of the separating structure, wherein the walls of the separating structure are provided with a plurality of recesses adjacent to the second permeable layer, the plurality of recesses each being formed in wall structures extending between adjacent radial wall structures, and the wall structures comprising the recesses are circumferentially arranged about a center of the separating structure, and the adjacent radial wall structures extend outwardly from a center of the separating structure, and
wherein each recess of the plurality of recesses is in a bottom edge of the wall structures and the wall structures form a circumferential wall, and the circumferential wall extends transversely relative to and intersects the adjacent radial wall structures, and wherein each recess of the plurality of recesses is formed by a concave surface of the bottom edge extending from one of the adjacent radial wall structures to another of the adjacent radial wall structures; and
wherein the flow channels extend from at least one aperture of the plurality of apertures to the second permeable layer, and wherein an entrance to the flow channels is provided by between one and five apertures per flow channel;
wherein the first permeable layer is a polypropylene covered paper layer; and
wherein the pad is arranged for producing a chocolate beverage and the filling contains a soluble chocolate ingredient.

2. The pad according to claim 1, wherein the first permeable layer is substantially impermeable except for the apertures.

3. The pad according to claim 1, wherein a cross-sectional area per individual flow channel of the flow channels, measured in parallel with the first and/or second permeable layer, is between 0.6 and 1.2 square centimeter.

4. The pad according to claim 1, wherein the plurality of recesses each have a depth along the walls of the flow channels that is in a range from 1 millimeter to 4 millimeter.

5. The pad according to claim 1, wherein the entrance to the flow channels is provided by at most two apertures per flow channel.

6. The pad according to claim 1, wherein the pad, in a direction perpendicular to the first and second permeable layer, has a minimum thickness between and including 15 millimeter and 17 millimeter.

7. The pad of claim 1, wherein the entrance to the flow channels is provided by one aperture per flow channel.

8. The pad according to claim 1, wherein the plurality of apertures consists of 30 to 70 apertures, each individual aperture having a diameter of 0.2 to 0.5 millimeters.

9. A pad for producing a chocolate beverage, the pad comprising:
a first permeable layer and a second permeable layer opposite to the first permeable layer, further provided with a filling arranged in between the first and the second permeable layer, wherein the pad is arranged for receiving pressurized water through the first permeable layer, for dissolving, dispersing, and/or extracting at least part of the filling in the received pressurized water, and for releasing through the second permeable layer the water with the at least part of the filling dissolved, dispersed, and/or extracted therein to produce a beverage;

wherein the filling has a weight of at least 11 grams;

wherein a solubility of the filling is at least 60 weight percent;

wherein the first permeable layer has a plurality of apertures for receiving the pressurized water, the plurality of apertures having a size dimensioned for establishing swirling motion of the water inside the filling, the pad further comprising a separating structure comprising walls that extend from the first permeable layer to the second permeable layer and form flow channels that are mutually separated by the walls of the separating structure, wherein the flow channels extend from at least one aperture of the plurality of apertures to the second permeable layer, and wherein an entrance to the flow channels is provided by at most five apertures per flow channel;

wherein the walls of the separating structure are provided with a plurality of recesses adjacent to the second permeable layer, the plurality of recesses each being formed in wall structures extending between adjacent radial wall structures, and the wall structures comprising the recesses are circumferentially arranged about a center of the separating structure, and the adjacent radial wall structures extend outwardly from a center of the separating structure, and wherein each recess of the plurality of recesses is in a bottom edge of the wall structures and the wall structures form a circumferential wall, and the circumferential wall extends transversely relative to and intersects the adjacent radial wall structures, and wherein each recess of the plurality of recesses is formed by a concave surface of the bottom edge extending from one of the adjacent radial wall structures to another of the adjacent radial wall structures; and wherein the pad includes a soluble chocolate ingredient; and wherein the first permeable layer is a polypropylene covered paper layer.

10. The pad according to claim 9, wherein the first permeable layer is substantially impermeable except for the apertures.

11. The pad according to claim 9, wherein a cross-sectional area per individual of the flow channels, measured in parallel with the first and/or second permeable layer, is in a range between 0.6 and 1.2 square centimeter.

12. The pad according to claim 9, wherein the plurality of recesses each have a depth along the walls of the flow channels that is from 1 millimeter to 4 millimeter.

13. The pad according to claim 9, wherein the entrance to the flow channels is provided by two apertures per flow channel.

14. The pad according to claim 9, wherein the pad, in a direction perpendicular to the first and second permeable layer, has a minimum thickness of 15 millimeter to 17 millimeter.

15. The pad according to claim 9, wherein the filling has a weight of at least 13 grams.

16. The pad according to claim 9, wherein, a solubility of the filling is at least 80 weight percent.

17. The pad according to claim 9, wherein the filling has a weight of at least 15 grams.

18. The pad of claim 9, wherein the entrance to the flow channels is provided by one aperture per flow channel.

19. The pad according to claim 9, wherein the plurality of apertures consists of 30 to 70 apertures, each individual aperture having a diameter of 0.2 to 0.5 millimeters.

20. In combination, a pad for producing a beverage and a holder for the pad, the combination comprising:
a pad as recited in claim 1;
a pad holder having a cavity for receiving the pad;
wherein the pad is arranged for receiving pressurized water through the first permeable layer, for dissolving, dispersing, and/or extracting at least part of the filling in the received pressurized water, and for releasing through the second permeable layer the water with the at least part of the filling dissolved, dispersed, and/or extracted therein;
wherein the first permeable layer has a plurality of apertures for receiving the pressurized water, the apertures are configured to induce a swirl motion of the water inside the filling and the pad is positioned in the cavity of the pad holder.

21. The combination according to claim 20, wherein the second permeable layer faces a bottom part of the cavity, wherein a depth of the cavity in a direction perpendicular the second permeable layer is at least 15 millimeter.

22. The combination according to claim 20, wherein the bottom part of the cavity is provided with an outlet for guiding a beverage after it has left the pad, and wherein the pad holder is provided with an element for beating air into the beverage after it has left the pad and the outlet.

23. The combination according to claim 20, wherein the cavity has a cavity side wall and wherein the pad has a pad side wall that connects the first permeable layer and the second permeable layer, wherein an impermeable portion of the pad side wall that is adjacent to a portion of the cavity side wall when in use the pad is received by the cavity, has a curvature that is slightly higher than a curvature of the portion of the cavity side wall.

24. The combination according to claim 23, wherein the impermeable portion of the pad side wall and the portion of the cavity side wall are located near the second permeable layer.

25. The combination according to claim 20, wherein the pad is provided with a projection near the first permeable layer, and wherein a top part of the cavity of the pad holder is provided with a cavity recess that is dimensioned for receiving the projection.

26. A method of producing a beverage by using the pad as recited in claim 1, the method including the steps:
directing pressurized water through the plurality of apertures in the first permeable layer of the pad of claim 1;
dissolving, dispersing, and/or extracting at least part of the filling in the directed pressurized water;
releasing through the second permeable layer the water with the at least part of the filling dissolved, dispersed, and/or extracted therein to thereby produce a beverage;
wherein a swirling motion of the directed pressurized water inside the filling is established by the plurality of apertures of the first permeable layer.

27. The method according to claim 26, wherein the filling has a weight of at least 15 grams.

* * * * *